United States Patent
Itasaki et al.

(10) Patent No.: US 9,807,180 B2
(45) Date of Patent: Oct. 31, 2017

(54) INFORMATION PROCESSING APPARATUS, WORK ENVIRONMENT LINKING METHOD AND WORK ENVIRONMENT LINKING PROGRAM

(71) Applicant: FUJITSU LIMITED, Kawasaki-shi, Kanagawa (JP)

(72) Inventors: Akira Itasaki, Yokohama (JP); Hirokazu Aritake, Atsugi (JP); Hiroyasu Sugano, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 14/739,715

(22) Filed: Jun. 15, 2015

(65) Prior Publication Data

US 2015/0281375 A1  Oct. 1, 2015

Related U.S. Application Data

(63) Continuation of application No. PCT/JP2012/082709, filed on Dec. 17, 2012.

(51) Int. Cl.
| | | |
|---|---|---|
| *H04L 29/08* | (2006.01) | |
| *G06F 9/44* | (2006.01) | |
| *G06F 17/30* | (2006.01) | |

(52) U.S. Cl.
CPC .......... *H04L 67/148* (2013.01); *G06F 9/4446* (2013.01); *G06F 17/30* (2013.01); *H04L 67/10* (2013.01)

(58) Field of Classification Search
CPC ....... G06F 17/30; G06F 9/4446; H04L 67/10; H04L 67/148
See application file for complete search history.

(56) References Cited

U.S. PATENT DOCUMENTS 5,767,853 A 6/1998 Yoshida et al.
2001/0044829 A1* 11/2001 Lundberg ............. G06Q 10/107
709/206

FOREIGN PATENT DOCUMENTS

JP 1-293063 11/1989
JP 5-108439 4/1993
(Continued)

OTHER PUBLICATIONS

International Search Report dated Mar. 5, 2013, in corresponding International Application No. PCT/JP2012/082709.
(Continued)

*Primary Examiner* — Ranodhi Serrao
(74) *Attorney, Agent, or Firm* — Staas & Halsey LLP

(57) ABSTRACT

An information processing apparatus includes a processor to execute a process including: creating, from history information when using a file acquired from a link origin terminal and a link destination terminal that are connected through a communication network, a correspondence condition between items included in the history information and an application used by the link destination terminal; acquiring, from the history information, latest history information with respect to a link target file used by the link origin terminal based on a link request from one of the link origin terminal and the link destination terminal; determining an application when using the link target file at the link origin terminal based on the acquired latest history information and the created correspondence condition; and sending information regarding the determined application to the link destination terminal.

9 Claims, 14 Drawing Sheets

(56) References Cited

FOREIGN PATENT DOCUMENTS

| | | |
|---|---|---|
| JP | 8-101766 | 4/1996 |
| JP | 11-60821 | 3/1999 |
| JP | 2000-132440 | 5/2000 |
| JP | 2003-196134 | 7/2003 |
| JP | 2005-49929 | 2/2005 |
| JP | 2009-237879 | 10/2009 |
| JP | 2011-107853 | 6/2011 |
| WO | 2012/046800 | 4/2012 |

OTHER PUBLICATIONS

Written Opinion of the International Searching Authority dated Mar. 5, 2013 in corresponding International Application No. PCT/JP2012/082709.

Patent Abstracts of Japan, Publication No. 5-108439, published Apr. 30, 1993.
Patent Abstracts of Japan, Publication No. 2003-196134, published Jul. 11, 2003.
Patent Abstracts of Japan, Publication No. 2000-132440, published May 12, 2000.
Patent Abstracts of Japan, Publication No. 2005-49929, published Feb. 24, 2005.
Patent Abstracts of Japan, Publication No. 1-293063, published Nov. 27, 1989.
Patent Abstracts of Japan, Publication No. 11-60821, published Mar. 5, 1999.
Patent Abstracts of Japan, Publication No. 2009-237879, published Oct. 15, 2009.
Patent Abstracts of Japan, Publication No. 8-101766, published Apr. 16, 1996.
Patent Abstracts of Japan, Publication No. 2011-107853, published Jun. 2, 2011.

* cited by examiner

FIG.6

| No. | OPERA-TION TERMINAL | FILE NAME | FILE ID | USER | FILE CREATOR | HISTORY | APP NAME | USER OPERA-TION | OPERATION DATE AND TIME |
|---|---|---|---|---|---|---|---|---|---|
| 1 | Terminal 1 | C://doc/minutes_draft.ppt | 1_203454 | A | A | Copy from server | presen-soft | View | 2012.09.09 17:55 |
| 2 | Terminal 2 | mnt/sdcard/minutes_draft.ppt | 2_810282 | A | A | Update | editing soft | Edit | 2012.09.09 18:07 |
| 3 | Terminal 1 | C://temp/Test1.ppt | 1_615163 | A | A | Create new | presen-soft | Edit | 2012.09.10 14:13 |
| 4 | Terminal 1 | C://temp/Test1.ppt | 1_615163 | A | A | Update | presen-soft | Edit | 2012.09.10 14:28 |
| 5 | Terminal 1 | C://share/Test1.ppt | 1_284304 | A | A | Copy in terminal | presen-soft | – | 2012.09.10 14:29 |
| 6 | Terminal 1 | C://doc/Temp.ppt | 1_153321 | A | B | Attach to mail | presen-soft | Edit | 2012.09.10 15:40 |
| 7 | Terminal 1 | C://doc/patent_draft.ppt | 1_214589 | A | B | Copy from server | presen-soft | View | 2012.09.10 15:42 |
| 8 | Terminal 2 | mnt/sdcard/Temp.ppt | 2_810812 | A | B | From SD | viewer | View | 2012.09.10 18:02 |
| 9 | Terminal 2 | mnt/sdcard/patent_draft.ppt | 2_229432 | A | B | From SD | viewer | View | 2012.09.10 18:02 |
| 10 | Terminal 2 | mnt/sdcard/share/Test1.ppt | 2_884751 | A | A | Update | editing soft | Edit | 2012.09.10 18:13 |
| 11 | Terminal 1 | C://share/work_data.ppt | 1_057473 | A | C | Attach to mail | presen-soft | View | 2012.09.13 17:15 |
| 12 | Terminal 2 | mnt/sdcard/share/work_data.ppt | 2_840139 | A | C | Copy out of terminal | – | – | 2012.09.13 17:15 |
| 13 | Terminal 1 | C://doc/minutes_fix.ppt | 1_301812 | A | A | Attach to mail | presen-soft | View | 2012.09.13 17:20 |
| 14 | Terminal 2 | mnt/sdcard/share/work_data.ppt | 2_840139 | A | C | View | viewer | View | 2012.09.13 17:43 |
| 15 | Terminal 2 | mnt/sdcard/minutes_fix.ppt | 2_731058 | A | A | View | viewer | View | 2012.09.13 17:49 |

FIG.7

| No. | PARENT FILE ID | PARENT TERMINAL ID | CHILD FILE ID | CHILD TERMINAL ID |
|---|---|---|---|---|
| 1 | 1_203454 | Terminal 1 | 2_810282 | Terminal 2 |
| 2 | 1_615163 | Terminal 1 | 1_284304 | Terminal 1 |
| 3 | 1_284304 | Terminal 1 | 2_884751 | Terminal 2 |
| 4 | 1_153321 | Terminal 2 | 2_810812 | Terminal 2 |
| 5 | 1_214589 | Terminal 1 | 2_229432 | Terminal 2 |
| 6 | 1_057473 | Terminal 1 | 2_840139 | Terminal 2 |
| 7 | 1_301812 | Terminal 1 | 2_731058 | Terminal 2 |

FIG.8

| CRITERION | | USE APPLICATION NAME | | SAMPLE NUMBER |
|---|---|---|---|---|
| | | viewer | editing soft | |
| FILE CREATOR | A | once (33%) | twice (67%) | 3 |
| | B | twice (100%) | – | 2 |
| | C | once (100%) | – | 1 |
| HISTORY | Create new | – | once (100%) | 1 |
| | Copy | once (50%) | once (50%) | 2 |
| | Attach to mail | three times (100%) | – | 3 |
| USER OPERATION | Edit | once (50%) | once (50%) | 2 |
| | View | three times (75%) | once (25%) | 4 |

FIG.9

| CRITERION | | USE APPLICATION NAME | | SAMPLE NUMBER |
|---|---|---|---|---|
| | | viewer | application for RDP | |
| FILE CREATOR | A | once (33%) | twice (67%) | 3 |
| | B | twice (100%) | — | 2 |
| | C | once (100%) | — | 1 |
| HISTORY | Create new | — | once (100%) | 1 |
| | Copy | once (50%) | once (50%) | 2 |
| | Attach to mail | three times (100%) | — | 3 |
| USER OPERATION | Edit | three times (100%) | — | 3 |
| | View | — | three times (100%) | 3 |
| FILE POSITION | Terminal 1 | — | twice (100%) | 2 |
| | Terminal 2 | three times (100%) | — | 3 |

FIG.10

| CRITERION | | USE APPLICATION NAME | | SAMPLE NUMBER |
|---|---|---|---|---|
| | | viewer | editing soft | |
| FILE CREATOR | A | once (33%) | once (67%) | 3 |
| | B | twice (100%) | — | 2 |
| | C | once (100%) | — | 1 |
| HISTORY | Create new | — | once (100%) | 1 |
| | Copy | once (50%) | once (50%) | 2 |
| | Attach to mail | three times (100%) | — | 3 |
| USER OPERATION | Edit | — | three times (100%) | 3 |
| | View | three times (100%) | — | 3 |
| FOLDER ON TERMINAL 1 | C://share | — | twice (100%) | 2 |
| | Others | four times (100%) | — | 4 |

FIG.11

| CRITERION | | USE APPLICATION NAME | | SAMPLE NUMBER |
|---|---|---|---|---|
| | | viewer | editing soft | |
| FILE CREATOR | A | 1 point (once) | 4 point (twice) | 3 |
| | B | 4 point (twice) | — | 2 |
| | C | 1 point (once) | — | 1 |
| HISTORY | Create new | — | 1 point (once) | 1 |
| | Copy | 1 point (once) | 1 point (once) | 2 |
| | Attach to mail | 9 point (three times) | — | 3 |
| USER OPERATION | Edit | 1 point (once) | 1 point (once) | 2 |
| | View | 9 point (three times) | 1 point (once) | 4 |

FIG.12

| EXTENSION | APPLICATION NAME OF TERMINAL 1 | APPLICATION NAME OF TERMINAL 2 | CRITERION |
|---|---|---|---|
| .ppt | presen-soft | viewer | Attach to mail |
| | | | (Other than mail) and (File creator is other than A) |
| | | editing soft | (Other than mail) and (File creator is A) |

FIG.13

| EXTENSION/ APPLICATION | OS1 | OS2 |
|---|---|---|
| jpg, bmp, png | soft A, soft B, soft C | soft a, soft b, soft c |
| ppt | presen-soft A | ppt viewer |
| doc | editing soft A | text viewer |
| txt | editing soft A, editing soft B, editing soft C | editing soft a, editing soft b |
| PDF | editing soft D, editing soft E | PDF viewer |
| browser | browser A, browser B, browser C | browser A, browser B, browser a |
| Explorer | file managing soft A | file managing soft a, file managing soft b, file managing soft c |
| mailer | mail soft A | mail soft a |

FIG.14

| FILE NAME | USE APPLICATION NAME | | REQUIRED TIME |
|---|---|---|---|
| | viewer | editing soft | |
| test1 | — | ○ | 0:15 |
| test2 | — | ○ | 3:30 |
| test3 | — | ○ | 6th-day 15:48 |
| test4 | ○ | — | 7th-day 3:50 |
| test5 | ○ | — | 12th-day 3:11 |

INFORMATION PROCESSING APPARATUS, WORK ENVIRONMENT LINKING METHOD AND WORK ENVIRONMENT LINKING PROGRAM

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/082709 filed on Dec. 17, 2012, designating the U.S., the entire contents of the foregoing application are incorporated herein by reference.

FIELD

The embodiments discussed herein are directed to an information processing technique for appropriately linking a work environment with another work environment.

BACKGROUND

Conventionally, with popularization of a smartphone, a tablet-type terminal, etc., it has become popular that one person possesses a plurality of information devices. Because these devices have many duplex functions and differ in their screen size and portability, there is a demand for achieving work linkage with a device suitable for each scene of use. For example, there may be a scene of use in which a person uses a personal computer (PC) at home and the same person works on an information device such as a smartphone, a tablet-type terminal, etc., when commuting or going out.

Additionally, in order to achieve a work linkage, it is necessary to achieve a data linkage and a linkage of work environments (for example, applications (hereinafter, may be abbreviated as the "app"). The data linkage can be materialized by using a cloud storage (for example, Dropbox (Registered Trademark), Evernote (Registered Trademark), etc.) or copying data by previously connecting the devices to each other by a cable or the like.

Moreover, Japanese Laid-Open Patent Application No. H05-108439 discloses a technique to link a startup program as attribute information to a file to store the attribute information in a file attribute table. Additionally, Japanese Laid-Open Patent Application No. 2003-196134 discloses a technique according to which an image can be freely changed in a reduction display on an explorer and a client is notified of a corresponding operation by sending an image ID to a server side. Further, Japanese Laid-Open Patent Application No. 2000-132440 discloses a technique in which a database part is provided with, when referring to a file, a history and a write destination (terminal classification) as a file attribute in order to manage a group of files used in a computer aided design (CAD) or the like. Additionally, Japanese Laid-Open Patent Application No. 2005-49929 discloses a technique to associate not only an extension provided to a file but also a directory with an application to activate a specific application for each directory.

However, it is difficult for the above-mentioned conventional techniques to process data by an appropriate application with respect to a work linkage between different devices when, for example, there are a plurality of candidates for an application of a linking destination that is usable with respect to certain data. Thus, it is difficult to appropriately achieve a linkage of work environments.

SUMMARY

There is provided according to an aspect of the embodiments an information processing apparatus including a processor to execute a process including: creating, from history information when using a file acquired from a link origin terminal and a link destination terminal that are connected through a communication network, a correspondence condition between items included in the history information and an application used by the link destination terminal; acquiring, from the history information, latest history information with respect to a link target file used by the link origin terminal based on a link request from one of the link origin terminal and the link destination terminal; determining an application when using the link target file at the link origin terminal based on the acquired latest history information and the created correspondence condition; and sending information regarding the determined application to the link destination terminal.

There is provided according to another aspect of the embodiments a work environment linking method, including: creating, from history information when using a file acquired from a link origin terminal and a link destination terminal that are connected through a communication network, a correspondence condition between items included in the history information and an application used by the link destination terminal; acquiring, from the history information, latest history information with respect to a link target file used by the link origin terminal based on a link request from one of the link origin terminal and the link destination terminal; determining an application when using the link target file at the link origin terminal based on the acquired latest history information and the created correspondence condition; and sending information regarding the determined application to the link destination terminal.

There is provided according to a further aspect of the embodiments a work environment linking program for causing a computer to perform a process including: creating, from history information when using a file acquired from a link origin terminal and a link destination terminal that are connected through a communication network, a correspondence condition between items included in the history information and an application used by the link destination terminal; acquiring, from the history information, latest history information with respect to a link target file used by the link origin terminal based on a link request from one of the link origin terminal and the link destination terminal; determining an application when using the link target file at the link origin terminal based on the acquired latest history information and the created correspondence condition; and sending information regarding the determined application to the link destination terminal.

BRIEF DESCRIPTION OF DRAWINGS

FIG. 6 is an illustration illustrating an example of data stored in a history information storing part;

FIG. 7 is an illustration illustrating another example of the data stored in the history information storing part;

FIG. 8 is an illustration of a first specific example of a corresponding condition;

FIG. 9 is an illustration of a second specific example of the corresponding condition;

FIG. 10 is an illustration of a third specific example of the corresponding condition;

FIG. 11 is an illustration of a fourth specific example of the corresponding condition;

FIG. 12 is an illustration of a first example of a correspondence relationship;

FIG. 13 is an illustration of a second example of the correspondence relationship; and FIG. 14 is an illustration for explaining another example of a decision of a linking application.

DESCRIPTION OF EMBODIMENT(S)

A description will now be given, with reference to the drawings, of embodiments.

<Configuration of Work Environment Linking System>

Figure 1:
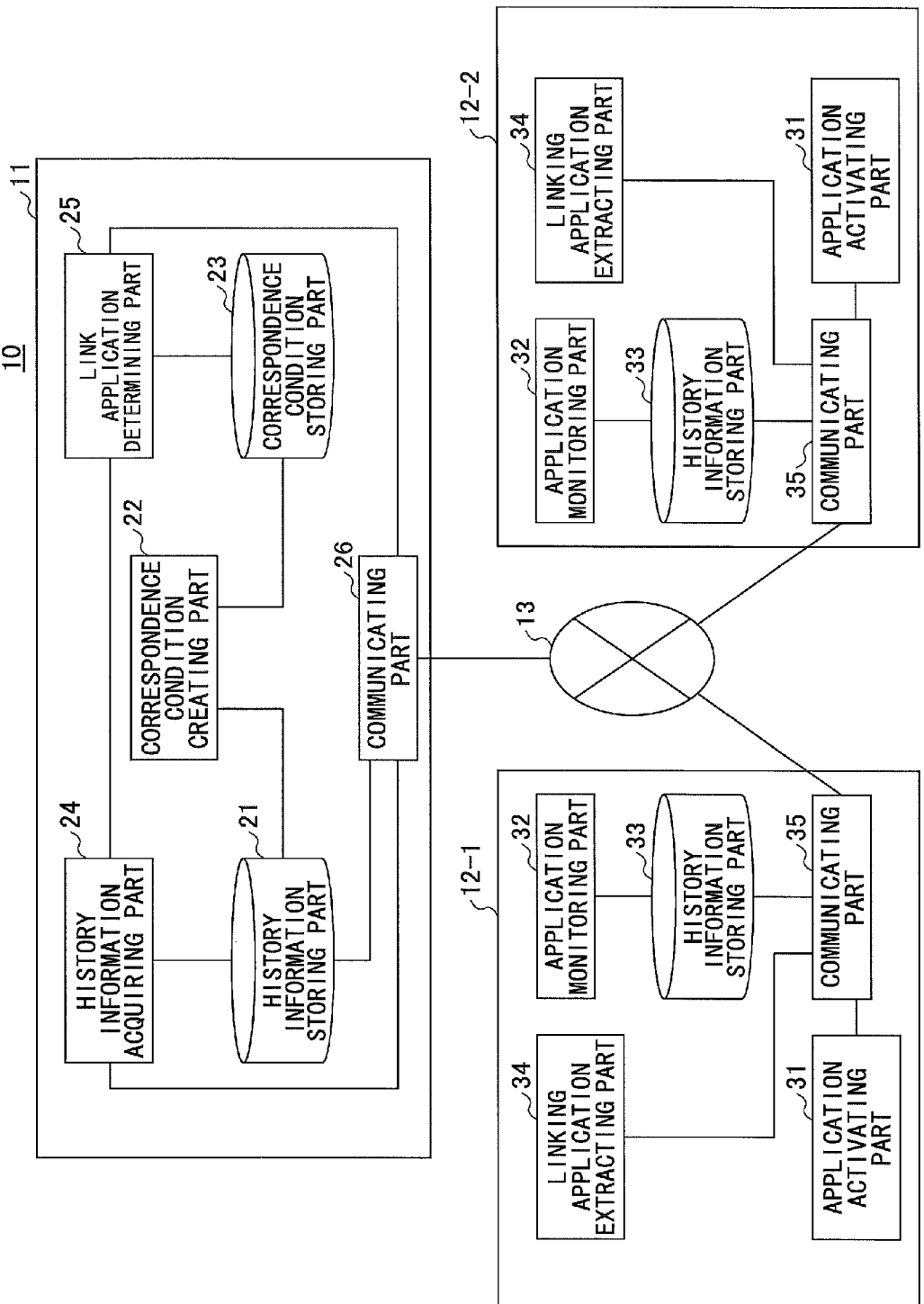
FIG. 1 is a diagram illustrating a configuration of a work environment linking system.

FIG. 1 is a diagram illustrating a configuration of a work environment linking system. The work environment linking system 10 illustrated in FIG. 1 includes a work environment linking server 11 as an example of an information processing apparatus and a plurality of terminals 12-1 and 12-2 (hereinafter, may be collectively referred to as the "terminals 12") that link with each other. The number of the terminals 12 is not limited to two, and may be three or more. The work environment linking server 11 and the terminals 12 are connected with each other in a state where transmission and reception of data can be performed by a communication network 13 represented by, for example, the Internet, a local area network (LAN), etc.

The work environment linking server 11 manages, for example, operation history information with respect to data (for example, a file) used for each user and information regarding a corresponding condition and a correspondence relationship of the link target application.

Additionally, the work environment linking server 11 is allowed to use, but not limited to, for example, a cloud storage, a synchronization service or the like when linking data such as a file to be managed between different terminals with each other.

Additionally, for example, when linkage is requested by one of the terminals 12 of a link source and a link destination, the work environment linking server 11 determines a linking application executed in one of the terminals 12 that is to be linked with (hereinafter, referred to as the "link destination terminal 12") based on history information with respect to data to be linked and a previously requested judgment condition.

Additionally, the work environment linking server 11 is capable of operating data and files by executing an appropriate application in the link destination terminal 12 by sending link application information to the link destination terminal 12.

Here, the above-mentioned application is an application that materializes at least one of functions such as, for example, an editing function, reviewing function, printing function, mailing function and operations such as copying data, deleting data, renaming data. Such an application includes, for example, software (hereinafter, may be abbreviated as the "soft") and programs.

The work environment linking server 11 is, but not limited to, for example, a server or a personal computer (PC). For example, the work environment linking server 11 may be a server or the like that is constituted by cloud computing. The cloud computing is a service form that collectively manages and provides, for example, one or a plurality of hardware, software, files and data, to a user.

Each of the terminals 12 is a terminal used by a user. For example, when a user executes a predetermined application using one of the terminals 12 (for example, the terminal 12-1: hereinafter may be referred to as the "link origin terminal 12") to edit or view a file, the link origin terminal 12 sends the history information regarding the editing or viewing to the work environment linking server 11.

Moreover, if it is desirous to use the edited or viewed file by another one of the terminals 12, the terminal 12-1 sends a link request to the work environment linking server 11. Additionally, the terminal 12-1 may send to the work environment linking server 11 a file used when the link request is made or when there is a schedule for linking and information of the another one of the terminals 12 (for example, the terminal 12-2: hereinafter may be referred to as the "link destination terminal 12").

Note that, in the present embodiment, when the link destination terminal 12-2 desires to use the file edited or reviewed by the link origin terminal 12-1, the link request may be sent from the link destination terminal 12-2. In such a case, the link destination terminal 12-2 sends to the work environment linking server 11, for example, information of the link origin terminal 12-1 together with the link request.

Additionally, the link destination terminal 12-2 acquires link application information corresponding to the link request from the work environment linking server 11, and edits or views the link target file using the application based on the acquired link application information.

Note that when the link destination terminal 12-2 performs editing or viewing a file or the like, the link destination terminal 12-2 sends the history information of the file to the work environment linking server 11. Thereby, the user can edit or view the file executed in the terminal 12-2 by activating an appropriate application in the terminal 12-1. Accordingly, the present embodiment can cause the work environments such as applications to be used in the terminals linking with each other so as to enable the user to perform editing or viewing the file or the like by an appropriate application.

Each of the terminals 12 may be, but not limited to, one of various terminals such as, for example, a personal computer (PC), a smartphone, a tablet-type terminal, etc.

Next, a description is given of a specific functional configuration of the work environment linking server 11 and the terminals 12. Note that a description is given below of a file, as an example of data to be linked with, in which data is stored with a predetermined format, but the data is not limited to such a file. As an example of the file, there are various types of files such as, for example, a document file, a file for presentation, an image file, a video file, an audio file, etc. Additionally, as an example of the file, there are files of various formats such as, for example, a hypertext markup language (HTML) file, a portable document format (PDF) file, etc., but the file is not limited to the aforementioned.

<Functional Configuration of the Work Environment Linking Server 11>

The work environment linking server 11 illustrated in FIG. 1 includes a history information storing part, a correspondence condition creating part 22, a corresponding condition storing part 23, a history information acquiring part 24, a linking application determining part 25 and a communicating part 26. Note that the history information storing part 21 and the correspondence condition storing part 23 may be provided as a single storing part.

The history information storing part 21 stores history information including information regarding files and applications that are used by each of the terminals 12 (for example, the link origin terminal and the link destination terminal). As for the history information, there are various items such as, for example, an operation terminal name, a file name, a user name of a user who uses a file, a file creator, a history, an application name of an application used, contents of an operation, operation time information, etc. The file name may include address information of a storing part. Additionally, the operation time information may contain at least one pieces of information from among pieces of time information such as a date and time at which an application is executed, an operation start date and time, an operation end date and time and an accumulated operation time.

Additionally, the history information is not limited to the aforementioned items, and, for example, a file size (capacity) or a user evaluation with respect to a file may be used. The history information is merely required to contain at least one of the aforementioned items. Additionally, the information stored in the history information storing part 21 is not limited to the aforementioned.

The above-mentioned history information may be requested periodically by each of the terminals 12 that are connected to the communication network 13 through the communicating part 26, or may be requested by the work environment linking server 11 to the terminals 12, or may be acquired at a predetermined timing such as a time when the history information is updated in the terminals 12.

The correspondence condition creating part 22 acquires the history information stored in the history information storing part 21. The history information at this time is, but not limited to, information for each user, each file or each terminal 12, and the aforementioned may be combined.

Additionally, the correspondence condition creating part 22 creates a correspondence condition of the application used between the linking terminals 12 based on the acquired history information. Additionally, the correspondence condition creating part 22 creates a correspondence relationship between a usable application, which his set in response to an extension of a file, and a criterion for determining the application used in a link destination. Note that the correspondence relationship is not limited to the relationship between the terminals 12, but may be created using, for example, an operating system (OS) as a criterion used between the terminals 12.

The correspondence condition creating part 22 outputs the created correspondence condition and correspondence relationship to the correspondence condition storing part 23. Note that the correspondence condition creating part 22 updates the information in the correspondence condition storing part 23 if an old correspondence condition or correspondence relationship is stored in the correspondence condition storing part 23.

The processing in the corresponding condition creating part 22 may be performed, but not limited to, periodically, or at a time when the history information is updated, or at a time of reception of the above-mentioned link request. For example, the correspondence condition creating part 22 may perform the processing at a timing of receiving the information of applications installed in the terminals 12, or the aforementioned timings may be combined.

The correspondence condition storing part 23 stores information for determining the application used at the link destination. For example, the correspondence condition storing part 23 stores information regarding the correspondence condition and the correspondence relationship that are acquired by the correspondence condition creating part 22. Additionally, the correspondence condition storing part 23 extracts the correspondence condition and the correspondence relationship based on an acquisition request for the correspondence condition and the correspondence relationship that is sent from the linking application determining part 25, and outputs the extracted information to the linking application determining part 25.

The history information acquiring part 24 acquires a link request from the link origin terminal 12-1 or the link destination terminal 12-2 that is received by the communicating part 26. The link request includes, but not limited to, for example, request information indicating execution of a work linkage, a file name of a link target, a terminal name of the link target, etc. For example, the terminal name of the link target is terminal information of the link destination if the link request is from the link origin terminal 12-1, and is terminal information of the link origin terminal 12-1 if the link request is from the link destination terminal 12-2.

Additionally, the history information acquiring part 24 acquires, by referring to the history information storing part 21, the latest history information from among history information at the time when the link origin terminal 12-1 used the link target file contained in the link request. The history information acquiring part 24 outputs the acquired history information to the linking application determining part 25.

The linking application determining part 25 is a determining part that determines an application (linking application) to be used when executing the link target file at the link destination terminal 12-2 based on the history information acquired by the history information acquiring part 24.

Specifically, the linking application determining part 25 acquires a correspondence relationship corresponding to the extension of the file contained in the history information acquired by the history information acquiring part 24 from among a plurality of correspondence relationships stored in, for example, the correspondence condition storing part 23. Additionally, the linking application determining part 25 determines the linking application used at the link destination terminal 12-2 in accordance with the acquired correspondence relationship.

Here, if there are a plurality of applications usable by the link destination terminal 12-2 in correspondence with the extension of the file of the link target, the linking application determining part 25 determines the linking application using the correspondence condition stored in the correspondence condition storing part 23. Note that, if there is only one application which is usable by the link destination, the linking application determining part 25 determines the one application as the linking application without using the above-mentioned correspondence condition.

The link application information acquired by the linking application determining part 25 is output to the communicating part 26, and, then, sent to the link destination terminal 12-2 from the communicating part 26 through the communication network 13. Note that the information sent to the link destination terminal 12-2 may contain not only the linking application information but also the link target file. The link target file to be sent may be the file itself, or may be a storage destination of the file (address information).

Note that, if there is no application usable by the link destination terminal 12-2 according to the correspondence relationship with respect to the extension of the link target file, the linking application determining part 25 may send information indicating that there is no usable application to the link destination terminal 12-2.

The communicating part 26 performs transmission and reception of data with a plurality of terminals 12 through, for example, the communication network 13. Specifically, the communicating part 26 receives the history information from each terminal 12 and outputs the history information to the history information storing part 21. Additionally, when the communicating part 26 receives a link request from, for example, the link origin terminal 12-1 or the link destination terminal 12-2, the communicating part 26 outputs the link request to the history information acquiring part 24.

Additionally, the communicating part 26 sends the linking application information acquired from the linking application determining part 25 to the link destination terminal 12-2. Note that, the communicating part 26 may send the above-mentioned link target file in addition to the linking application information.

That is, the work environment linking server 11 extracts the history of the file or the like, which has been used by the plurality of terminals 12, from the history information collected from the plurality of terminals 12, and manages the work environments as to which application was used to execute the file.

Additionally, in response to the link request, the work environment linking server 11 presents an appropriate file to the link destination terminal 12-2 by using the immediately preceding (latest) history information with respect to the file that was used by the link origin terminal 12-1 and the correspondence condition and the correspondence relationship that are acquired from the past history information.

<Functional Configuration of Each of the Terminals 12>

A specific description is given of a functional configuration of each of the terminals 12. Note that the terminal 12-1 and the terminal 12-2 illustrated in FIG. 1 has the same functional configuration, and the terminals 12-1 and 12-2 are collectively described below. Each of the terminal 12-1 and terminal 12-2 illustrated in FIG. 1 includes an application activating part 31, an application monitoring part 32, a history information storing part 33, a linking application extracting part 34 and a communicating part 35.

The application activating part 31 activates and executes the application to cause a predetermined file to be executed from among applications previously installed by the terminals 12. Additionally, the application activating part 31 is capable of executing the predetermined file using the link application information extracted by the linking application extracting part 34 from the work environment linking server 11, or causing an application to be activated.

The application monitoring part 31 monitors contents of execution of the application that is activated by the application activating part 31 (for example, contents of operation) and a processing condition such as a start or end of the process. Additionally, the application monitoring part 32 stores the application information acquired from a monitoring result and information regarding the application used by the executed application (for example, contents of the operation and date and time of the operation) as the history information in the history information storing part 33. For example, when copying a file or changing a directory, by storing the files and the paths before and after the operation as the file history, one can follow the history of the file. Additionally, the application monitoring part 32 may monitor a timing of sending the history information, which is stored in the history information storing part 33, to the work environment linking server 11.

Note that, when starting use of the service by the work environment linking system 10 or if there is an application newly installed or deleted, the application monitoring part 32 sends information regarding applications installed in the terminal 12 to the work environment linking server 11. Thereby, the management of the applications corresponding to each terminal can be appropriately performed on the side of the work environment linking server 11.

The history information storing part 33 sends the stored history information to the work environment linking server 11 periodically or at a predetermined timing according to an instruction from the user at the time of ending the application or at the time of updating the history information. Note that the history information is sent from the communicating part 35 to the work environment linking server 11 via the communication network 13.

If the terminal 12 is the link origin, the link application extracting part 34 sends a link request to the work environment linking server 11 in order to extract the linking application to be used when using the link target file at the terminal 12 of the link destination.

Additionally, if the terminal 12 is the link destination, the link application extracting part 34 sends a link request to the work environment linking server 11 in order to extract the linking application to be used when using the link target file to acquire the link application information from the work environment linking server 11.

Note that the link request contains, but not limited to, for example, request information for notifying that a linkage is made and the name of the file to be the link target. For example, if the link requesting terminal is the link origin terminal 12-1, the link request may contain information regarding the link destination terminal 12-2, and if the link requesting terminal is the link destination terminal 12-2, the link request may contain information regarding the link origin terminal 12-1. The link request is sent from the communicating part 35 to the work environment linking server 11 via the communication network 13.

The communicating part 35 performs data transmission and reception with the work environment linking server 11 and other terminals 12 through, for example, the communication network 13. Specifically, if the terminal 12 becomes the link origin, the communicating part 35 sends the history information acquired from the history information storing part 33 to the work environment linking server 11 through the communication network 13.

Additionally, if the terminal 12 becomes the link destination, the communicating part 35 sends the link request acquired by the linking application extracting part 34 to the work environment linking server 11 through the communication network 13, and receives the corresponding linking application information from the work environment linking server 11. Additionally, the communicating part 35 outputs the received link application information to the application activating part 31 to activate the target application.

Note that the communicating part 35 may send the file created or viewed by the link origin terminal 12-1 to the work environment linking server 11 to cause the work environment linking server 11 to manage the file, or may send the file directly to the link destination terminal 12-2. Additionally, when sending the file or the like to other apparatuses, it may be send by attaching to electronic mail or the like.

According to the above-mentioned configuration, an appropriate application can be activated at the link destination terminal 12-2 by merely designating for linkage the data currently used by the user at the link origin terminal 12-1.

Additionally, according to the present embodiment, there is no need to pay attention to the data path (storage destination) or the executing application, thereby reducing a large amount of linking operation between the terminals 12. Further, by integrally using the history of the plurality of terminals 12, the file can be executed by an application appropriate for each terminal even if a file having a low frequency of use is used or the terminal 12 having a low frequency of use is used.

<Hardware Configuration of the Work Environment Linking Server 11 and the Terminals 12>

Here, in the above-mentioned work environment linking server 11 and the terminals 12, the work environment linking process according to the present embodiment can be achieved by creating an execution program that can cause a computer to perform each function and installing the execution program in, for example, a general purpose personal computer or a communication terminal. Here, a description is given, with reference to the drawings, of a hardware configuration of a computer that can materialize the work environment linking process.

Figure 2:
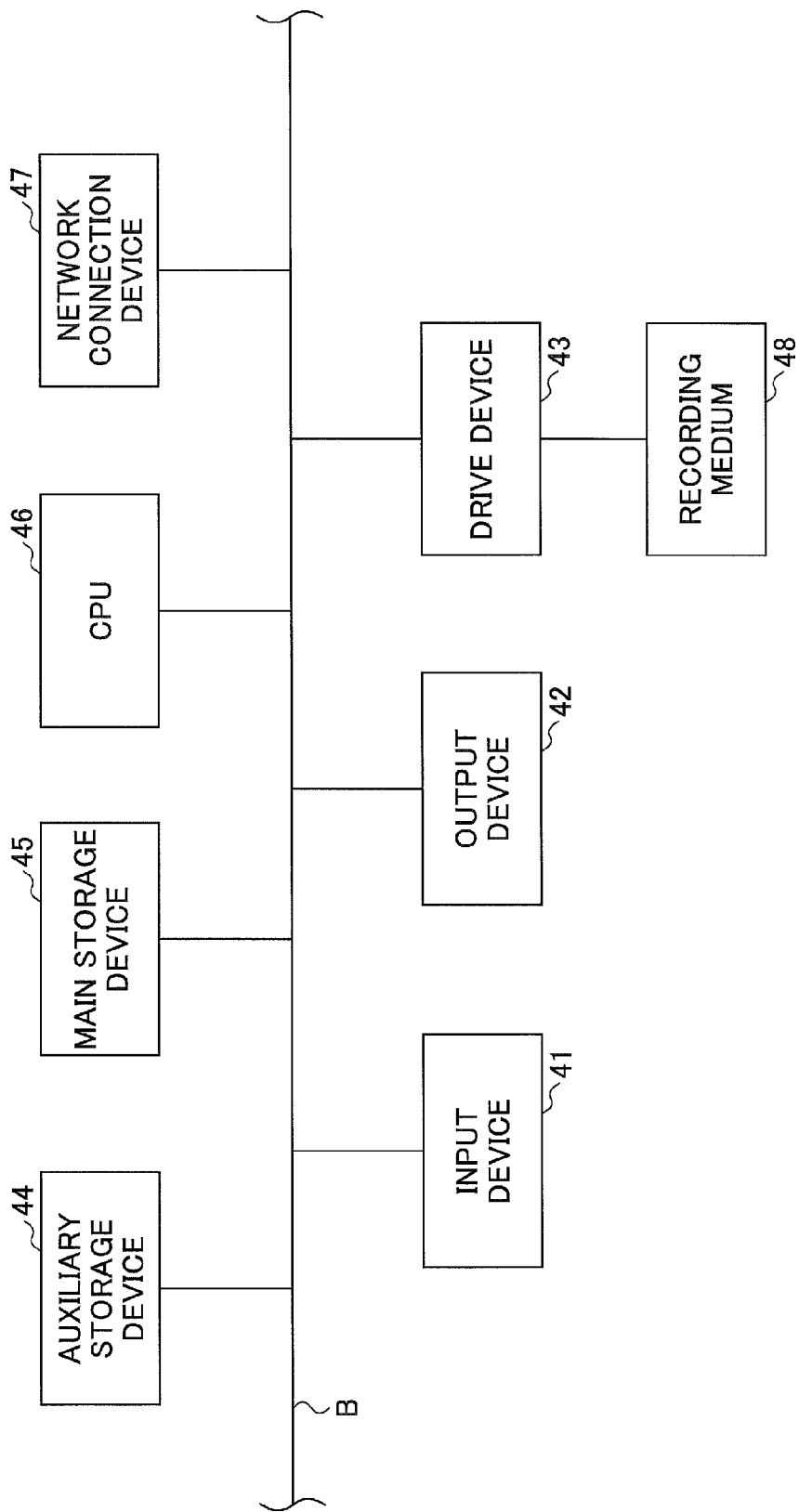
FIG. 2 is a block diagram of a hardware configuration according to which a work environment linking process is feasible.

FIG. 2 illustrates a hardware configuration of a computer that can materialize the work environment linking process. The computer illustrated in FIG. 2 includes an input device 41, an output device 42, a drive device 43, an auxiliary storage device 44, a main storage device 45, a central processing unit (CPU) 46 performing various kinds of controls, and a network connection device 47, which are mutually connected by a system bus B.

The input device 41 includes a pointing device such as a keyboard and a mouse that are operated by a user and an audio-input device such as a microphone. The input device 41 inputs an execution command of a program from the user, various kinds of operation information, information for activating software, etc., to the computer.

The output device 42 includes a display for displaying various kinds of windows and data necessary for operating the computer to perform the process according to the present embodiment so as to display the progress of execution and the result of execution of the program according to the control program installed in the CPU 46. Note that the input device 41 and the output device 42 may be integrated into a one-piece unit such as, for example, a touch panel.

The execution program installed in the computer is provided by a portable recording medium 48 such as, for example, a universal serial bus (USB) memory, a CD-ROM, a DVD, etc. The recording medium 48 on which the program is recorded can be set in the drive device 43. The execution program included in the recording medium 48 is installed in the auxiliary storage device 44 from the recording medium 48 via the drive device 43 based on a control signal from the CPU 46.

The auxiliary storage device 44 is a storage unit such as, for example, a hard disk drive, a solid state drive (SSD), etc. The auxiliary storage device 44 stores the execution program according to the present embodiment and a control program provided in the computer. The auxiliary storage device 44 is capable of inputting or outputting the programs according to the control signal from the CPU 46. The auxiliary storage device 44 is also capable of reading necessary information from the stored information or writing necessary information according to a control signal from the CPU 46.

The main storage device 45 stores the execution program read by the CPU 46 from the auxiliary storage device 44. Note that the main storage device 45 is constituted by a read only memory (ROM), a random access memory (RAM), etc.

The CPU 46 can materializes each processing such as various kinds of operations and an input/output operation of data by controlling the process for the entire computer based on the control program such as an operating system and the execution program stored in the main storage device 45. Note that the various kinds of information necessary for the execution of the programs can be acquired from the auxiliary storage device 44, and a result of execution can be stored in the auxiliary storage device 44.

Specifically, for example, the CPU 46 performs the process corresponding to the programs on the main storage device 45 by causing the programs installed in the auxiliary storage device 44 to be executed based on an execution command or the like of the programs acquired from the input device 41.

For example, if the CPU 46 is included in the work environment linking server 11, the CPU 46 performs storing the above-mentioned file history, updating the corresponding application, storing the corresponding application, acquiring the history information, deciding the conversion target, performing a control in communication with external devices, etc. Additionally, if the CPU 46 is included in one of the terminals 12, the CPU performs activating the above-mentioned application, monitoring the application, storing the file history, extracting the linking application, performing a control in communication with external devices. Note that contents of the process in the CPU 46 are not limited to the aforementioned. The contents of the process executed by the CPU 46 can be stored, if necessary, in the auxiliary storage device 44.

The network connection device 47 acquires the execution program, software, setting information etc., from external devices connected to the communication network 13 by connecting to the communication network 13 based on a control signal from the CPU 46. Additionally, the network connection device 47 can provide a result of execution acquired by executing the program or the execution program itself according to the present embodiment to the external devices.

According to the above-mentioned hardware configuration, the work environment linking process according to the present embodiment can be performed. Additionally, by installing the program, the work environment linking process according to the present embodiment can be achieved by a general-purpose personal computer (PC), a communication terminal, etc.

Note that if one of the terminals 12 is a communication terminal such as a smartphone or the like, the one of the terminals 12 may include, in addition to the above-mentioned configuration, for example, a position measuring device using a global positioning system (GPS), an acceleration senor, an angular velocity sensor, etc. Additionally, the network connection device 47 may include a communicating part, which enables a communication by, for example, Wi-Fi®, Bluetooth®, etc.

<Example of the Work Environment Linking Process>

A description is given below, with reference to flowcharts of FIG. 3 through 5, of examples of the work environment linking process according to the present embodiment. Note that the work environment linking process includes a process performed on the side of the work environment linking server 11 (a link managing process) and a process performed on the side of the terminals 12 (a linking process), and a description is given of each process.

<Link Managing Process in the Work Environment Linking Server 11>

<History Storing Process>

Figure 3:
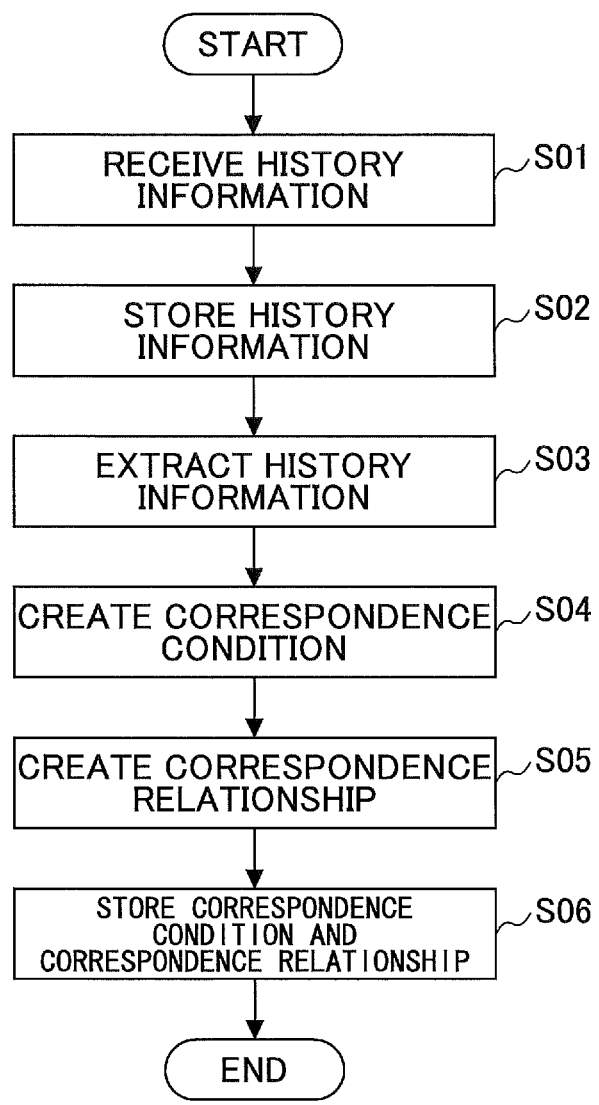
FIG. 3 is a flowchart of a linkage managing process at a work environment linking server.

FIG. 3 is a flowchart illustrating an example of the link managing process in the work environment linking server 11. Note that, in the example of FIG. 3, a history storing process is illustrated as an example of the link managing process. In the history storing process illustrating FIG. 3, the communicating part 26 receives history information at the time of using a file or application from one the terminals 12 (step S01). The history information storing part 21 stores the received history information (step S02). Note that, in the above-mentioned process, the communicating part 26 may receive not only the history information but also the file itself corresponding to the history information.

Subsequently, the correspondence condition creating part 22 extracts history information for each file or for each user from the history information stored in the history information storing part 21 (step S03). Then, the correspondence condition creating part 22 creates the correspondence condition for linking work environments between the terminals 12 from the extracted history information (step S04). Additionally, the correspondence condition creating part 22 creates the correspondence relationship of the applications between the terminals 12 that are the targets for linking (step S05), for example, for each extension of the files. Note that, in the process of step S05, the correspondence relationship may be created not for each extension but using other information which can identify a format of each file.

Additionally, the correspondence condition creating part 22 stores the correspondence condition and the correspondence relationship acquired by the above-mentioned process in, for example, the correspondence condition storing part 23 or the like (step S06).

<Linking Application Providing Process>

Figure 4:
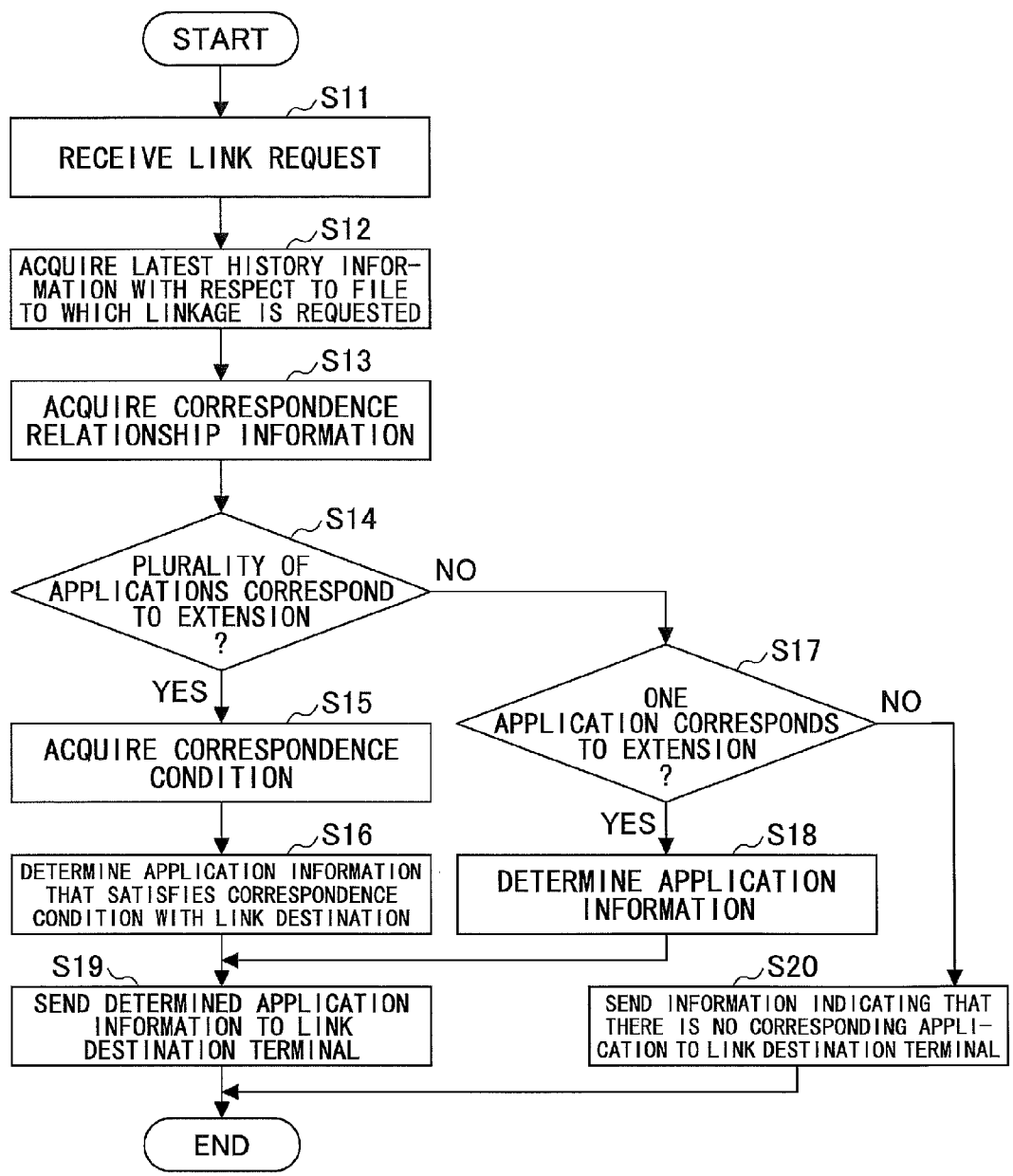
FIG. 4 is a flowchart of another linkage managing process at the work environment linking server.

FIG. 4 is a flowchart of another example of the link managing process in the work environment linking server 11. Note that, in the example of FIG. 4, a linking application providing process is illustrated as an example of the link managing process.

In the linking application providing process illustrated in FIG. 4, the communicating part 26 receives the above-mentioned link request from one of the terminals 12 (step S11). Note that the link request may be sent from the link origin terminal 12-1 or may be sent from the link destination terminal 12-2.

The history information acquiring part 24 refers to the history information storing part 21 based on the link request received by the communicating part 26, and acquires the latest history information which has been used by the link origin terminal 12-1 with respect to the file for which the link is requested (step S12).

The linking application determining part 25 acquires the correspondence relationship information with the link destination terminal 12-2 from the correspondence condition storing part 23 using the extension of the file name or the terminal information of the link origin that are contained in the latest history information acquired by the process of step S12 (step S13).

The linking application determining part 25 judges whether, for example, a plurality of applications correspond to the extension of the link target file in the link destination terminal 12-2 based on the correspondence relationship information acquired by the process of step S13 (step S14). Note that the judgment as to whether a plurality of applications correspond to the extension corresponds to the judgment as to whether a plurality of applications that can use the link target file are present.

If a plurality of applications correspond to the extension (YES in step S14), the linking application determining part 25 acquires the correspondence relationship from the correspondence condition storing part 23 (step S15), and determines the application information that satisfies the correspondence condition with the link destination. On the other hand, if a plurality of applications do not correspond to the extension (NO in step S14), the link application determining part 25 judges whether only one application corresponds to the extension (step S17). Then, if one application corresponds to the extension (YES in step S17), the linking application determining part 25 determines the one application as the application information (step S18).

After the process of step S16 or S18, the linking application determining part 25 sends the determined application information to the link destination terminal 12-2 through the communicating part 26 (step S19). On the other hand, if it is determined in the process of step S17 that one application does not correspond to the extension (NO in step S17), the linking application determining part 25 sends information indicating the fact to the link destination terminal 12-2 through the communicating part 26 because there is no application corresponding to the extension.

<Linking Process in the Terminals 12>

A description is given below of the linking process as an example of the work environment linking process in one of the terminals 12. Note that, in the following description, the linking process is explained in a case where a link request for executing a link target file is made by, for example, the link destination terminal 12-2. However, the contents of the process in one of the terminals 12 are not limited to the followings.

Figure 5:
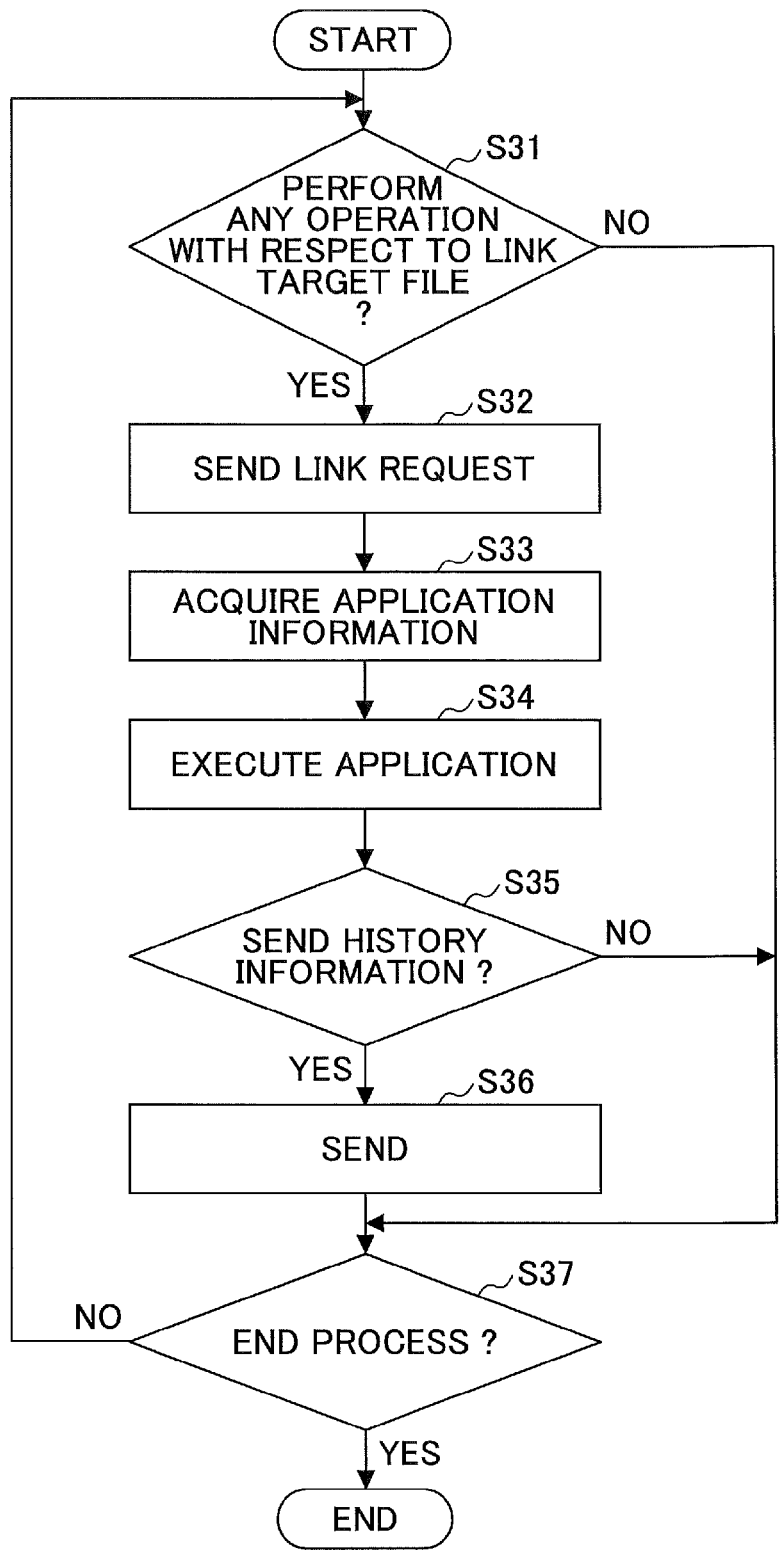
FIG. 5 is a flowchart of a linkage process at a terminal.

FIG. 5 is a flowchart of an example of the linking process in one of the terminals 12. In the linking process illustrated in FIG. 5, for example, the link destination terminal 12-2 judges whether to perform any operation on the link target file (step S31). Note that the operation with respect to the link target file is, but not limited to, for example, editing the file, viewing the file, changing the file name (rename), deleting the file, attaching the file to electronic mail, copying the file, etc.

If any operation is performed with respect to the link target file (YES in S31), the link application extracting part 34 sends the above mentioned link request to the work environment linking server 11 (step S32). Then, the linking application extracting part 34 acquires the corresponding application information from the work environment linking server 11 (step S33). Note that, in step S33, not only the application information but also the link target file may be acquired from the work environment linking server 11.

Subsequently, the application activating part 31 executes the application acquired by the work environment linking server 11 in step S33 (step S34) to execute the link target file.

Additionally, after the execution of the application by the process of step S34 is ended, the application monitoring part 32 judges whether to send the corresponding history information (step S35). If it is judged that the history information is to be sent (YES in step S35), the application monitoring part 32 sends the history information (step S36).

Here, after the process of step S36 is ended, the application monitoring part 32 judges whether to end the process (step S37). Note that the process of step S37 is performed if any operation is not performed with respect to the link target file in the above-mentioned process of step S31 (NO in step 32) or if the history information is not transmitted in the process of S35 (No in step S35).

If the process is not ended (NO in step S37), the linking process returns to step S31. That is, the linking process is performed if, but not limited to, any one of operations is performed with respect to the link target file. On the other hand, if the process is ended according to an instruction by the user (YES in step S37), the linking process is ended.

Additionally, although the execution process of the linking application with respect to the file operation is explained with reference to the example of FIG. 5, the work environment linkage is not limited to that explained above, and may be applicable to a linking process with respect to other data.

Additionally, although the link request is made by the link destination terminal 12-2 in the example of FIG. 5, the example of FIG. 5 may include a process of sending, for example, the link target file, the history information or information for identifying the link destination terminal 12-2. Thereby, in the target destination terminal 12-2, an appropriate application can be executed by acquiring the application information without performing the above-mentioned process of sending the link request of step S23.

<Example of Various Kinds of Data>

A description is given below of examples of various kinds of data used in the present embodiment.

<Example of Data Stored in the History Information Storing Part 21>

FIGS. 6 and 7 are illustrations of examples of data stored in the history information storing part 21. Note that FIG. 6 illustrates an example of history information as an example of the data. FIG. 7 indicates correspondence relationships between the terminals 12 linked with each other.

The history information illustrated in FIG. 6 includes, but not limited to, items such as, for example, "operation terminal", "file name", "file ID", "user", "file creator", "history", "application name", "user operation" and "operation date and time". For example, the history information may include data such as "user evaluation" in which a user evaluation with respect to the file is set, "accumulated operation time", "last operation time", etc. Additionally, in the example of FIG. 6, a user A uses two terminals (terminal 1 and terminal 2), and history information for each of the plurality of users is stored in the history information storing part 21.

The "operation terminal" indicates identification information of the terminals 12 used by the users. In the example of FIG. 6, it is assumed that the terminal 1 is the above-mentioned terminal 12-1 and the terminal 2 is the above-mentioned terminal 12-2.

The "file name" indicates the file name of the link target. In the example of FIG. 6, the address information of the store destination is illustrated, but not limited to, as the file name.

The "file ID" is identification information for identifying individually the file name. In the present embodiment, there may be a case where the file ID sent from the link origin terminal 1 has already existed in the link destination terminal 2. Thus, the correspondence relationship of the file ID is managed so that the linkage of the file can be appropriately performed between the terminals even in such a case.

Specifically, as illustrated in FIG. 7, with respect to the same file, the file ID of the link origin (hereinafter, referred to as the "parent file ID") and the file ID of the link destination (hereinafter, referred to as the "child file ID") are managed. Additionally, in the example of FIG. 7, the terminals 12 of the link origin and link destination are also managed as terminal IDs (the parent terminal ID and the child terminal ID). Thereby, even when a file name created by the link origin (for example, the terminal 1) exists in the link destination (for example, the terminal 2), the file name can be managed by rewriting such a file name into a file name that never exists.

For example, in the example of FIG. 7, with respect to the file ID "1_203454" created by the terminal 1 (parent terminal), the file ID used in the terminal 2 (child terminal) is converted into "2_810282". That is, in the present embodiment, name identification is performed on the file ID of the information of FIG. 6 according to the tracing table illustrated in FIG. 7.

Additionally, in FIG. 6, the "user" is the user name of the user who used the file. If, for example, the work environment linking server 11 acquires the history information from one of the terminals 12, the "user" sets the user name previously set in the one of the terminals 12 that sent the history information.

The "file creator" is a user who created or updated the file. The "file creator" may use, but not limited to, for example, information contained in the property information of the file. For example, each of the terminals 12 may acquire it at the time of creating or updating the file.

The "history" is information indicating an origin such as from where or how the file has been acquired. For example, information is set in the "history" as to whether it is a newly created file, a file attached to mail, a copy of a file, a file acquired from a recording medium.

The "application name" is a name of the application that used the file. The "application name" includes, but not limited to, for example, a "presentation software" (hereinafter, may be abbreviated as the "presen-soft"), an "editing soft" and a "viewer" as an example of viewer software, etc. For example, applications such as a mailer (mail software), a browser, etc., may be included in the "application name". Further, for example, a specific application name including version information and a software name may be set in the "application name".

The "user operation" is information for identifying each operation which the user performed on the file. The "user operation" includes contents of various kinds of operations, such as viewing, editing, renaming, deleting, etc., with respect to the file and data, but the type of contents of the operations is not limited to these. For example, an operation of copying a file from the terminal 1 to the terminal 2 may be stored.

The "operation date and time" is a date and time at which the user performed an operation with respect to the file. Note that, in the example of FIG. 6, the operations are sorted in the order of date and time and the identification number (No.) is set to each record, but the arrangement is not limited to that manner.

<Specific Example of Object Condition>

A description is given below, with reference to FIGS. 8 through 11, of a specific example of the object condition in the correspondence condition creating part 22. FIGS. 8 through 11 are illustrations indicating specific examples of the correspondence condition. Note that in the examples illustrated in FIGS. 8 through 11, the file created in the terminal 1 (link origin) is used by the terminal 2 (link destination).

As items of the correspondence condition illustrated in FIG. 8 through 11, there are "criterion", "use application name" indicating a name of application that is usable at the terminal of the link destination, and "sample number", but the number of items and contents are not limited to that illustrated in those figures.

Note that each of the correspondence conditions illustrated in FIGS. 8 through 11 is information acquired by the correspondence condition creating part 22 based on the history information acquired from, for example, the above-mentioned history information storing part 21, and the information is stored in the correspondence condition storing part 23.

In the example of FIG. 8, there are "viewer" and "editing soft" as applications that can be used by the link destination terminal 2 with respect to the file sent from the link origin terminal 1. The application name of the application which can be used can be acquired by, but not limited to, for example, the correspondence relationship information with respect to the extension of the file. Additionally, a specific application name of the application actually installed in the terminal 2 is set to the "editing soft".

For example, if the file creator contained in the latest history information of the link origin terminal 1 with respect to a certain link target file is "A", it is appreciated from the correspondence condition illustrated in FIG. 8 that the link destination terminal 2 used the "viewer" once and the "editing soft" twice in the past. Thus, the "editing soft" is determined as the linking software according to the frequency of use. Additionally, if the file creator is "B" or "C", the "viewer" is determined as the linking software because the terminal 2 used only the "viewer" in the past.

Additionally, with respect to other criteria, the linking application can be determined in a similar manner based on a frequency of use. Note that the frequency of use is preferably extracted from a certain number of samples. Accordingly, in the present embodiment, for example, the above-mentioned determination of the linking application based on the frequency of use may be performed if the number of samples is greater than or equal to a predetermined number.

Additionally, in the example of FIG. 8, for example, the user operation contained in the latest history information of the link origin terminal 1 is "edit", the "viewer" was used once and the "editing soft" was used once and the frequency of use is the same (50%). In such a case, the linking application may be determined using, for example, information of other items of the history information.

For example, if the "application name" contained in the latest history information of the link origin terminal 1 is the "editing soft", the "editing soft" is set as the linking application because it is highly possible that editing is performed also in the link destination.

Note, that the determining method is not limited to the above-mentioned method. For example, if there are sets of history information in the link destination terminal 2 with respect to the same file in the past, the linking application may be determined using the latest history information among the sets of history information. For example, if the contents of the "user operation" contained in the latest history information of the link destination terminal 2 is "view", the "viewer" is set as the linking application. Further, as the determination method of the linking application, for example, an application name which is previously set by the user or the server manager may be used.

That is, in the present embodiment, if the frequencies of use of a plurality of applications are the same, the linking application can be determined using a previously set other correspondence condition.

Additionally, in the present embodiment, there may be a case where, for example, the link destination terminal 2 does not save a file of which substance is in the link origin terminal 1 in the terminal 2 and uses the file remotely. In such a case, an application which can be used while the substance of the file is located in the terminal 1 is set as the linking application.

That is, if there is a correspondence condition such as illustrated in FIG. 9 and if a position of a file to link is in the terminal 1 and the substance of the file is not in the terminal 2, a "Remote Desktop Protocol (RPD) application" is set as the linking application.

Additionally, for example, if the linkage is set by copying the substance of the file in the terminal 2, the "viewer" is set as the linking application according to the correspondence condition illustrated in FIG. 9. In the present embodiment, the application to be used by the link destination terminal (12-2) can be determined in response to the file position and the method of acquiring the file based on the correspondence condition such as illustrated in FIG. 9.

Additionally, if there is a correspondence condition such as illustrated in FIG. 10, the criterion of the "user operation" use the "editing soft" when editing the file and "viewer" when viewing the file. Here, for example, if there is a history indicating that a file which is not edited by the terminal 1 is not edited by the terminal 2, a predetermined application (for example, the "viewer") is designated preferentially when linking the file from the terminal 1 to the terminal 2.

Additionally, as illustrated in the example of FIG. 10, in a case where, for example, a folder on the terminal 1 is set as a criterion, it is assumed that there is a history indicating that a file in a specific folder (for example, C://share) is edited by the terminal 2 and other files are merely viewed.

In such a correspondence condition, it is checked which folder of the terminal 1 retains the file based on the storage destination of the file, and a predetermined application (for example, the "editing soft") is determined preferentially as the linking application based on the result of check.

Additionally, in the present embodiment, an application to be executed when linking can be appropriately determined by selecting a plurality of correspondence conditions from among various kinds of correspondence conditions and combining the selected correspondence conditions by giving a weight to each of the correspondence conditions. When giving a weight, all of the histories containing a certain criterion are extracted when creating the correspondence condition, and the number of times of use is acquired for each application used in the terminal 2. Additionally, a point given a weight for the number of times of use is added to each correspondence condition.

For example, it is assumed that, in a case where there is a correspondence condition such as illustrated in FIG. 11, the "file creator" is "A" and the "history" is "new creation" and the "user operation" is "edit" in the latest history information before linkage to a certain file.

In this case, a weighted point is added based on the frequency of use. Note that as an example of the addition of the point, for example, a square of the frequency of use can be set to the point, but is not limited to this. For example, the point when the frequency of use is one is $1^3=1$, and the point when the frequency of use is two is $2^2=4$. Thereafter, a total point is calculated for each application used. In the example of FIG. 11, the total point of the "viewer" is 2 points (1+0+1), and the total point of the "editing soft" is 6 points (4+1+1). According to the above-mentioned result of calculation, for example, the "editing soft" given a large total number is determined as the linking application, and the link application information thereof is sent to the terminal 2. Note that, although the application given a large total point is determined as the linking application, the determination is not limited to this, and the linking application may be determined using other criteria in response to a method of adding a weight.

Additionally, the method of determining the linking application in the present embodiment is not limited to the above-mentioned contents. For example, if the link destination terminal 2 merely views a file that is acquired by being attached to mail or being downloaded from the link origin terminal 1, the file acquired in the same manner uses the application for viewing, such as the "viewer", as the linking application.

<Example of Correspondence Relationship>

A description is given, with reference to FIGS. 12 and 13, of examples of the correspondence relationship stored in the correspondence relationship storing part 23. FIGS. 12 and 13 are illustrations of examples of the correspondence relationship. The items in the correspondence relationship illustrated in FIG. 12 include, but not limited to, for example, "extension", "application name of terminal 1", "application name of terminal 2" and "criterion".

In the example of FIG. 12, a correspondence relationship of work environments is created between the terminal 1 and the terminal 2 according to, but not limited to, the extension of the file being used as a criterion. For example, the correspondence relationship may be set according to a file name being used as a criterion. The example of FIG. 12 indicates that if the application name of the terminal 1 with respect to the extension ".ppt" is "presen-soft", the application name of the terminal 2 to be linked is the "viewer" and "editing soft".

Additionally, in the example of FIG. 12, the criterion used when the "viewer" is determined as the linking application information is set as, for example, "attachment to mail" or "(other than attachment to mail) and (file creator is other than A)". Additionally, the criterion used when the "editing soft" is determined as the linking application information is set as, for example, "(other than attachment to mail) and (file creator is A)".

As mentioned above, in the present embodiment, the correspondence relationship of the applications can be easily obtained between the terminals linking with each other according to the extension being used as a criterion. Additionally, if there are a plurality of applications (use applications) usable at the link destination with respect to the extension, an appropriate linking application can be determined based on the above-mentioned correspondence condition. Accordingly, work environments can be appropriately linked with each other.

Additionally, in the present embodiment, the use application can be obtained based on the correspondence relationship between a file extension or application and a platform (for example, OS, etc.) as illustrated in FIG. 13.

In the example of FIG. 13, the application names of applications usable by each of the OS1, which the terminal 1 uses, and the OS2, which the terminal 2 uses, are illustrated with respect to the extensions and applications. Note that as the OS, there are, but not limited to, Windows®, Android®, iOS®, Linux®, etc. Thus, an appropriate linking application can be determined by previously creating and managing the correspondence relationship of each of the application names of the usable applications for each OS.

Note that the information with respect to a kind of OS and the application name installed in each of the terminals 12 can be acquired by, but not limited to, sending an OS request and an application request from the work environment linking server 11 to the terminal 1 or the terminal 2. For example, the information may be sent at the same time when sending each of the terminals 12 sends the history information to the work environment linking server 11, or may be sent at the time of start using the the work environment linking system 10.

Note that the example of linking the work environments between the two terminals has been explained in the above-mentioned embodiment, but the linkage is not limited to between the two terminals, and work environments may be linked with each other using three or more terminals.

For example, it is assumed that in a work environment linking system in which the OS1 is installed in the terminal 1 and the OS2 is installed in the terminal 2 and the terminal 3, history is sufficiently accumulated in the terminal 1 and the terminal 2 and no history is accumulated in the terminal 3.

Here, if the user instructs linkage from the terminal 1 to the terminal 3, the work environment linking server 11 determines the linking application to be executed, when linking from the terminal 1 to the terminal 2, using the history information of the terminal 2 that uses the same OS as the terminal 3. Then, the work environment linking server 11 sends the determined linking application information to the terminal 3 to have the terminal 3 to execute the process.

<Example Other than Extension>

Here, in the above-mentioned example of FIGS. 12 and 13 according to the present embodiment, the example of the linking application corresponding to the extension of the link target file is explained, the item used to determine the linking application is not limited to the extension. For example, there may be many cases where a required time period from date and time at which a certain file is operated at a link origin and until date and time at which the file is operated at the link destination is calculated and, the file is edited again if the calculated time period is shorter than a fixed period. Additionally, it is assumed that the history is obtained indicating that only viewing is performed if the fixed period has passed. In such a case, the linking application can be determined based on the above-mentioned required time period.

FIG. 14 is an illustration for explaining another example of determining the linking application. In the example of FIG. 14, a history of executing "viewer" or "editing soft" with linking with the terminal 2 from among files (for example, test1 through test6) for which a user executes at the terminal 1 is extracted from the above-mentioned history information. Note that in the example of FIG. 14, the date and time at which the file is operated at the terminal 1 and the date and time at which the file is operated at the terminal 2 are compared with each other so as to sort the histories using the required time period obtained from the difference.

As mentioned above, for example, by using the contents indicated in FIG. 14, the linking application corresponding to the tendency of a user can be determined. Specifically, from the contents illustrated in FIG. 14, the correspondence condition can be set so that, for example, the "editing soft" is used when the required time period in the file linkage is shorter than about 7 days and the "viewer" is used when the required time period in the file linkage is longer than or equal to about 7 days. Note that a plurality of the above-mentioned determining methods of the linking application may be combined.

As mentioned above, according to the present embodiment, the linkage of work environments between the terminals can be appropriately performed. Specifically, the work environment linking server 11 collects the histories of each of the terminals 12 and creates the correspondence condition and correspondence relationship between the linking terminals based on the collected histories. Additionally, when linkage is requested, the work environment linking server 11 acquires the latest history information when the file is used at the link origin terminal and notifies the link destination terminal of the linking application by determining the linking application based on the acquired history information and the corresponding relationship and correspondence condition. Thereby, in the link destination terminal, an appropriate environment can be restored at the link destination by receiving and activating the linking application, which materializes the work continuation.

Note that, conventionally, it has been necessary to select and perform an application by searching data each time a terminal is switched according to a conventional technique. However, according to the present embodiment, a user can cause an appropriate application to activate at a linking destination terminal by merely designating linkage of data currently used. Additionally, in the present embodiment, there is no need to pay attention to a data path and an application to executed, and a number of processes when switching a terminal is greatly reduced.

Additionally, according to the present embodiment, a file can be executed with an appropriate application by integrally using histories of a plurality of terminals even if, for example, the file or the terminal has a low frequency of use.

Moreover, the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transitory carrier medium such as an electrical, optical, microwave, acoustic or radio frequency signal carrying the computer code. An example of such a transitory medium is a TCP/IP signal carrying computer code over an IP network, such as the Internet. The carrier medium can also comprise a storage medium for storing processor readable code such as flexible magnetic disk, hard disc, CD-ROM, magnetic tape device or solid state memory device. The computer software can be provided to the programmable apparatus using any non-transitory recording medium for recording processor readable code, such as a flexible magnetic disk, hard disk, CD-ROM, magnetic tape, solid-state memory, etc. The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of CPU can serve as a physical memory or main memory of the apparatus, whereas the HDD can serve as a secondary memory of the apparatus.

Moreover, the structural elements of each of the embodiments may be materialized by a plurality of physically separated hardware components, or may be materialized by being distributed into a plurality of virtual machines that operates on a single server.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention. Moreover, all or a part of the constitutional elements of the above-mentioned embodiments may be combined without departing from the spirit and scope of the present invention.

What is claimed is:

1. An information processing apparatus, comprising a processor to execute a process including:
creating, based on history information including information regarding files and applications which are used by each of a link origin terminal and a link destination terminal that are connected through a communication network, a correspondence condition between files used by the link origin terminal and applications used by the link destination terminal;
acquiring, from the history information, latest history information regarding a link target file used by the link origin terminal, in response to a link request from one of the link origin terminal and the link destination terminal;
determining a linking application that is used by the link destination terminal to perform operation on the link target file and satisfies a criterion included in the correspondence condition with respect to the link destination terminal based on the latest history information and the correspondence condition; and
sending information regarding the linking application to the link destination terminal,
wherein the creating step creates a correspondence condition being corresponded to an application that is usable at said link destination terminal using an item contained in said history information as a criterion.

2. The information processing apparatus as claimed in claim 1, wherein the determining step determines an application based on a frequency of use when a plurality of applications are used at said link destination terminal based on said correspondence condition.

3. The information processing apparatus as claimed in claim 1, wherein the creating step creates a correspondence relationship between an application used at said link origin terminal and an application used at said link destination terminal based on an extension of said link target file, and the determining step determines said link target file based on said correspondence condition when there are a plurality of applications used at said link destination terminal from said correspondence relationship.

4. The information processing apparatus as claimed in claim 1, wherein, when said link origin terminal uses a first application and said link destination terminal remotely uses a link target file of which substance exists in said link origin terminal by using a second application, the determining step causes said second application to refer to the link target file of which substance exists in said link origin terminal.

5. The information processing apparatus as claimed in claim 1, wherein the determining step determines an application to use at said link destination terminal for each method of acquiring said link target file based on said correspondence condition.

6. The information processing apparatus as claimed in claim 1, wherein the determining step determines an application to use at said link destination terminal based on a frequency of use of an application used when executing other files contained in a predetermined folder in which said link target file is stored based on said correspondence condition.

7. The information processing apparatus as claimed in claim 1, wherein the determining step creates a condition for determining an application to use based on a required time period until a file operation is performed.

8. A work environment linking method, comprising:
  creating, based on history information including information regarding files and applications which are used by each of a link origin terminal and a link destination terminal that are connected through a communication network, a correspondence condition between files used by the link origin terminal and applications used by the link destination terminal;
  acquiring, from the history information, latest history information regarding a link target file used by the link origin terminal, in response to a link request from one of the link origin terminal and the link destination terminal;
  determining a linking application that is used by the link destination terminal to perform operation on the link target file and satisfies a criterion included in the correspondence condition with respect to the link destination terminal based on the latest history information and the correspondence condition; and
  sending information regarding the linking application to the link destination terminal,
  wherein the creating step creates a correspondence condition being corresponded to an application that is usable at said link destination terminal using an item contained in said history information as a criterion.

9. A non-transitory computer-readable recording medium having a work environment linking program stored therein for causing a computer to perform a process comprising:
  creating, based on history information including information regarding files and applications which are used by each of a link origin terminal and a link destination terminal that are connected through a communication network, a correspondence condition between files used by the link origin terminal and applications used by the link destination terminal;
  acquiring, from the history information, latest history information regarding a link target file used by the link origin terminal, in response to a link request from one of the link origin terminal and the link destination terminal;
  determining a linking application that is used by the link destination terminal to perform operation on the link target file and satisfies a criterion included in the correspondence condition with respect to the link destination terminal based on the latest history information and the correspondence condition; and
  sending information regarding the linking application to the link destination terminal,
  wherein the creating step creates a correspondence condition being corresponded to an application that is usable at said link destination terminal using an item contained in said history information as a criterion.

* * * * *